United States Patent [19]
Vandycke et al.

[11] Patent Number: 5,345,884
[45] Date of Patent: Sep. 13, 1994

[54] METHOD OF REDUCING POLLUTING EMISSIONS FROM CIRCULATING FLUIDIZED BED COMBUSTION INTALLATIONS

[75] Inventors: Michel Vandycke, Gambais; Jean-Xavier Morin, Neuville aux Bois, both of France

[73] Assignee: Stein Industrie, Velizy-Villacoublay, France

[21] Appl. No.: 155,288

[22] Filed: Nov. 22, 1993

[30] Foreign Application Priority Data

Nov. 24, 1992 [FR] France ................. 92 14086

[51] Int. Cl.⁵ ............................................. F23J 15/00
[52] U.S. Cl. ................................. 110/345; 110/215; 110/216; 110/245; 422/168; 423/242.1; 423/243.08
[58] Field of Search ............... 110/344, 345, 245, 215, 110/216, 165 R; 122/4 D; 423/242.1, 243.01, 243.08; 422/168, 169

[56] References Cited

U.S. PATENT DOCUMENTS

| 4,312,280 | 1/1982 | Shearer et al. |
| 4,600,568 | 7/1986 | Yoon et al. |
| 4,861,568 | 8/1989 | Robinson, Jr. |
| 4,917,024 | 4/1990 | Marten et al. ............ 110/345 X |
| 5,171,552 | 12/1992 | Miura et al. ............. 110/345 X |
| 5,178,101 | 1/1993 | Bell ............................ 122/4 D |
| 5,282,430 | 1/1994 | Nehls, Jr. ..................... 110/245 |

FOREIGN PATENT DOCUMENTS

| 0301272 | 2/1980 | European Pat. Off. |
| 2174082 | 10/1986 | United Kingdom |
| WO8804196 | 6/1988 | World Int. Prop. O. |
| WO9009226 | 8/1990 | World Int. Prop. O. |

Primary Examiner—Edward G. Favors
Attorney, Agent, or Firm—Sughrue, Mion, Zinn, Macpeak & Seas

[57] ABSTRACT

The present invention concerns a method of reducing polluting emissions from a circulating fluidized bed combustion installation including a furnace from which the dust is recovered at least in part by a cyclone, the partially dedusted gases output by the cyclone passing through a recovery boiler, and then into a dust filter, in which method a desulfurizing agent is inserted into the furnace. According to the invention, downstream from said recovery boiler, and upstream from said dust filter, the flue gases are desulfurized in semi-humid manner in a reaction enclosure provided with a water injection inlet. Downstream from said dust filter, the resulting desulfurization products are thermally oxidized.

12 Claims, 1 Drawing Sheet

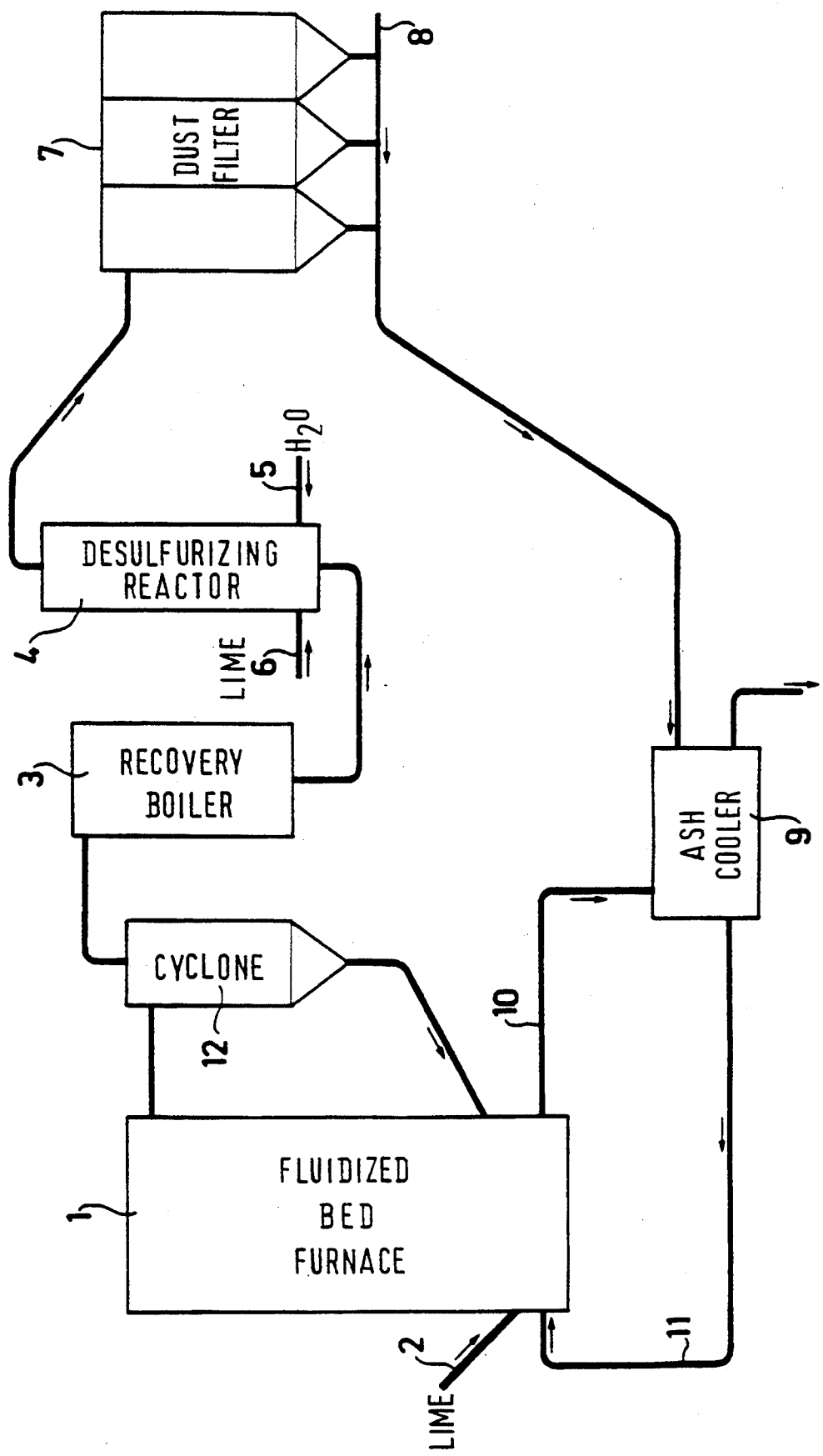

METHOD OF REDUCING POLLUTING EMISSIONS FROM CIRCULATING FLUIDIZED BED COMBUSTION INTALLATIONS

FIELD OF THE INVENTION

The present invention relates to a method of reducing polluting emissions from circulating fluidized bed combustion installations.

More precisely, the present invention concerns a method of reducing sulfur oxide emissions from a circulating fluidized bed combustion installation including a furnace into which a desulfurizing agent is inserted, and from which the solids in circulation are recovered by a cyclone, the partially dedusted gases output by the cyclone passing through a recovery boiler, and then into a dust filter, where the ash is collected.

BACKGROUND OF THE INVENTION

It is well known that circulating fluidized bed combustion is performed under conditions that are relatively favorable to reducing emissions of nitrogen oxides (nitrogen monoxide and nitrogen dioxide) and emissions of sulfur oxides (sulfur dioxide and sulfur trioxide). Since the combustion temperature is about 850° C. and the air intake is in stages, nitrogen oxides are produced in small quantities only, in general less than 200 mg/Nm$^3$ relative to dry flue gases having a residual oxygen content of 6%.

Sulfur oxides are currently collected by inserting a solid desulfurizing agent such as a calcareous rock into the combustion furnace. It is possible to collect about 95% of the sulfur oxides because the solids are mixed thoroughly as a result of the internal and external re-circulation, and of the combustion temperature of about 850° C.

However, any increase in desulfurizing performance levels by increasing the flow-rate of the desulfurizing agent would give rise to a substantial increase in nitrogen oxide emissions because of the catalytic effect of the desulfurizing agent on the conversion of nitrogen into nitrogen oxides. The known method is therefore not effective enough if its performance levels are to be improved, e.g. if the regulations become tighter.

Moreover, because of the low combustion temperature, the circulating fluidized bed gives rise to nitrous oxide (N$_2$O) emissions. Increasing the temperature so as to reduce nitrous oxide emissions gives rise to a detrimental reduction in desulfurization effectiveness.

Finally, if a surplus of desulfurizing agent is inserted into the furnace so as to obtain high desulfurization efficiency, then the circulating fluidized bed produces large quantities of solid residue.

OBJECTS AND SUMMARY OF THE INVENTION

The invention solves those problems by providing a method of reducing sulfur oxide emissions, which method makes it possible to increase desulfurization efficiency while reducing the quantity of desulfurizing agent required, thereby reducing the solid residues resulting therefrom, without increasing nitrogen oxide emissions caused by the catalytic effect of the desulfurizing agent, while also enabling the fluidized bed to operate at a higher temperature so as to reduce nitrous oxide emissions.

Japanese Patent No. 60-71025 filed on Sep. 23, 1983 describes a method of desulfurizing flue gases from a dense fluidized bed furnace, which method involves spraying the flue gases with water so as to humidify the gases, the sulfur dioxide in the gases reacting with a desulfurizing agent contained in the gases, the agent and the desulfurization products then being recovered by inserting the gases into a dust filter.

The invention improves that method by adapting it to a circulating fluidized bed, and furthermore it integrates oxidation of the sulfites contained in the desulfurization products.

To this end:

downstream from said recovery boiler, and upstream from said dust filter, the flue gases are desulfurized in semihumid manner in a reaction enclosure provided with a water injection inlet; and downstream from said dust filter, the resulting desulfurization products are thermally oxidized.

In a preferred embodiment, said desulfurization products are oxidized by being mixed in a reactor with circulating solids that are extracted from the furnace of the fluidized bed.

Preferably, the reactor is an ash cooler installed conventionally at the bottom of the furnace.

if necessary, additional desulfurizing agent is injected into said reaction enclosure, or upstream from said reaction enclosure, and said additional desulfurizing agent is preferably lime.

The lime may be in powder form or it may be a lime slurry whose temperature may optionally be controlled.

The invention also provides firstly a method of reducing nitrous oxide emissions, the method consisting in increasing the temperature in the furnace, and in performing the method as described above, and secondly an installation for performing the method.

The invention also provides a circulating fluidized bed combustion installation for performing the method described above.

BRIEF DESCRIPTION OF THE DRAWING

The invention is described in more detail below with reference to the accompanying drawing showing only one preferred embodiment of the invention.

The sole figure of the drawing is a diagrammatic view of an installation for performing the method of the invention.

MORE DETAILED DESCRIPTION

The top of a circulating fluidized bed furnace 1 fed with fuel is connected to a cyclone 12. At the base of the cyclone 12, solids are reinjected into the furnace 1. The partially dedusted gases output by the cyclone 12 pass into a recovery boiler 3. To treat the sulfur oxide emissions, a desulfurizing agent, preferably a calcareous rock, is injected at 2 into the furnace 1.

This known desulfurization method constitutes the first step of the method of the invention.

The method of the invention includes the following additional steps:

downstream from said recovery boiler 3, the flue gases are desulfurized in semi-humid manner in a reaction enclosure 4 provided with a water injection inlet 5 and optionally an additional desulfurizing agent injection inlet 6 for injecting additional desulfurizing agent, e.g. lime;

downstream from said reaction enclosure 4, the desulfurization products are collected at the base of a dust filter 7, preferably of the sleeve or electrostatic type; and downstream from said dust filter 7, the desulfurization products are thermally oxidized.

More precisely, said desulfurization products are oxidized by being mixed with circulating solids that are extracted at 10 from the furnace 1, the mixing taking place in a reactor 9 which is preferably the ash cooler installed conventionally at the bottom of the furnace 1.

The flue gases that penetrate into the enclosure 4 are loaded with fly ash, and in particular with surplus lime which has not reacted in the furnace 1. Injecting water at 5 into the enclosure 4 lowers the temperature of the flue gases to the vicinity of the saturation temperature, and reactivates the lime to produce significant additional desulfurization by means of the following simplified reactions:

$$CaO + H_2O \rightarrow Ca(OH)_2$$

$$Ca(OH)_2 + SO_2 \rightarrow CaSO_3 + H_2O$$

$$Ca(OH)_2 + SO_2 + \tfrac{1}{2}O_2 \rightarrow CaSO_4 + H_2O.$$

Emissions of halogen-containing compounds such as HCl and HF are also very significantly reduced by means of the following simplified reactions:

$$Ca(OH)_2 + HCl \rightarrow CaCl_2 + H_2O$$

$$Ca(OH)_2 + HF \rightarrow CaF_2 + H_2O.$$

When the flue gases penetrating into the enclosure 4 do not contain a sufficient quantity of lime, it is possible to inject an additional amount of quick lime CaO or of slaked lime Ca(OH)₂ into the enclosure 4 at 6 or upstream therefrom. The lime may be in powder form or in the form of an aqueous suspension which may be injected after being heated to a controlled temperature in order To improve the physico-chemical mechanisms.

Thermally oxidizing the residues collected at 8 enables the calcium sulfite to be transformed into calcium sulfate so as to enhance the residues or so as to make them easier to dump. To be effective, the oxidation must take place in an oxidizing medium at a temperature that is preferably greater than 400° C. Advantageously, the heat required is supplied by extracting the solids at 10 from the furnace 1.

The residues collected at 8, at a temperature in the range 50° C. to 80° C. are therefore mixed in the reactor 9 with solids at a temperature of about 850° C. taken from the furnace at 10. The flow-rate of the solids taken at 10 is adjusted so as to obtain the temperature required for the oxidation. To ensure that the fluidized bed continues to operate correctly, the solids are returned at 11 from the reactor 9 to the furnace 1.

The reactor 9 may be organized in various ways depending on the extent to which the various solids inserted therein are sorted by grain size. The reactor 9 is preferably the ash cooler that is conventionally installed at the bottom of the furnace 1, so as to extract the ash from the furnace in such a way as to maintain a constant inventory of solids in the furnace 1.

This method makes it possible to reduce the quantity of desulfurizing agent, and therefore to reduce the solid residues, by using the desulfurizing agent optimally, and this may be advantageous when measures are taken to tighten regulations.

The method makes it possible to increase the overall desulfurizing efficiency beyond 95%, without too much increase in the flow-rate of the desulfurizing agent in the fluidized bed, and therefore without any risk of increasing nitrogen oxide emissions by the catalytic effect of the desulfurizing agent, and this may be advantageous when regulations are very strict.

If nitrous oxide emissions are to be reduced, the method makes it possible for the fluidized bed to operate at a temperature that is higher than the conventional temperature. The resulting reduction in desulfurization effectiveness in the fluidized bed furnace 1 is then compensated by the desulfurization that takes place in the water-injection enclosure 4.

I claim:

1. A method of reducing sulfur oxide emissions from a circulating fluidized bed combustion installation including a furnace from which the dust is recovered at least in part by a cyclone, the partially dedusted gases output by the cyclone passing through a recovery boiler, and then into a dust filter, in which method a desulfurizing agent is inserted into the furnace, wherein:

downstream from said recovery boiler, and upstream from said dust filter, the flue gases are desulfurized in semi-humid manner in a reaction enclosure provided with a water injection inlet; and downstream from said dust filter, the resulting desulfurization products are thermally oxidized.

2. A method according to claim 1, wherein said desulfurization products are oxidized by being mixed in a reactor with circulating solids that are extracted from the furnace of the fluidized bed.

3. A method according to claim 2, wherein the reactor is an ash cooler installed conventionally at the bottom of the furnace.

4. A method according to claim 1, wherein additional desulfurizing agent is injected into said reaction enclosure.

5. A method according to claim 1, wherein additional desulfurizing agent is injected upstream from said reaction enclosure.

6. A method according to claim 4, wherein said additional desulfurizing agent is lime injected in powder form.

7. A method according to claim 4, wherein said additional desulfurizing agent is a lime slurry.

8. A method according to claim 7, wherein said lime slurry is injected after it has been heated to a controlled temperature.

9. A method of reducing nitrous oxide emissions, the method consisting in increasing the temperature in the furnace, and in performing the method according to claim 1.

10. A circulating fluidized bed combustion installation for performing the method according to claim 1, the installation including a furnace from which the dust is recovered at least in part by a cyclone, a recovery boiler through which the partially dedusted gases output by the cyclone pass, and a dust filter, wherein, downstream from said recovery boiler and upstream from the dust filter, the installation includes a reaction enclosure provided with a water injection inlet, and, downstream from said dust filter, said installation includes a thermal oxidation device for thermally oxidizing the desulfurization products obtained.

11. An installation according to claim 10, wherein said thermal oxidation device is a reactor in which said desulfurization products are mixed with circulating solids extracted from the furnace.

12. An installation according to claim 11, wherein the reactor is an ash cooler installed at the bottom of the furnace.

* * * * *